United States Patent [19]

Pingault

[11] 3,851,098

[45] Nov. 26, 1974

[54] PULSE TRANSMITTER FOR TRANSMISSION LINE

[75] Inventor: Benoit A. M. Pingault, Asnieres, France

[73] Assignee: International Standard Electric Corporation, New York, N.Y.

[22] Filed: June 14, 1973

[21] Appl. No.: 370,192

[30] Foreign Application Priority Data

June 16, 1972 France .............................. 72.21736

[52] U.S. Cl. .................................. 178/68, 307/260

[51] Int. Cl. ............................................ H03k 5/00

[58] Field of Search........ 178/66 R, 66 A, 68, 69 A; 325/42; 328/65, 59; 307/260, 282

[56] References Cited

UNITED STATES PATENTS 3,660,685 5/1972 Berger ................................ 307/260

*Primary Examiner*—Thomas A. Robinson

*Attorney, Agent, or Firm*—John T. O'Halloran; Menotti Lombardi, Jr.; Vincent Ingrassia

[57] ABSTRACT

A pulse transmitter is coupled to the transmission line through a pulse transformer, and at the end of a produced pulse, there occurs in the transformer a reverse voltage peak due to the fact that the magnetizing transformer current does not instantaneously vary when switched. The magnetizing current decreases and must be nulled before the generation of the next pulse. According to the invention, the reverse peak is utilized for accelerating such a magnetic current decrease, by diminishing the transformer damping.

6 Claims, 2 Drawing Figures

PULSE TRANSMITTER FOR TRANSMISSION LINE

BACKGROUND OF THE INVENTION

The present invention relates to pulse transmitters associated with a binary data wire transmission line, and more particularly, to pulse transmitters coupled by a transformer to transmission lines.

Such pulse transmitters are already well known. They are particularly used in data transmission between the various equipments of an assembly and, for example, between a computer and its different peripherals.

For certain utilizations, and for example, in large traffic telephone exchanges wherein common control is performed by computers, it is particularly important to have the possibility of transmitting a large amount of data within a short time. In this respect, transmission links are usually used which comprise a plurality of identical lines making it possible to transfer data in parallel.

Usually, the same link is not utilized full-time between two items which makes it possible to use time-shared links between a number of peripherals and a computer, because utilization of time-shared links can be maximum and optimum for obvious reasons.

This implies having transmitters capable of producing pulses at high frequency, which is not usually the case in known transmitters and, in particular, to have transmitters wherein pulses are produced from the discharge of a storage capacitor, the charging of which is performed through a charging resistor.

Indeed, the charging resistor of these pulse transmitters is usually utilized as a protection resistor against a possible short-circuit and, thus, cannot have a negligible value, which causes a progressive discharge of the storage capacitor when pulses are delivered, if the pulse cyclic rate and frequency are too high. Therefore a troublesome limit affects such transmission links. Moreover, pulse transmitter of this type usually need several different voltages. However, in such systems the number of voltage supplies is sought to be reduced for cost and reliability reasons.

SUMMARY OF THE INVENTION

To overcome these drawbacks, an object of the present invention is to provide a new pulse transmitter coupled by a transformer to a binary data transmission two-wire line generating pulses from the discharge of storage capacitor controlled by an outside item.

According to a feature of this invention, the pulse transmitter comprises means for recharging the storage capacitor which are responsive to the reciprocal peak current intensity occuring as a consequence of the storage capacitor discharge through the primary winding of the transformer.

The recharge means comprise an amplifier which is unoperating, at rest, during the capacitor discharge and which is responsive to the above mentioned reciprocal peak current intensity so as to balance the storage capacitor charge loss within a time shorter than the time interval between two possible successive pulses.

According to another feature of this invention, the pulse transmitter also comprises blocking means serially mounted between the secondary transformer winding and at least one of the line wires, so as to prevent any current from flowing through this winding in a direction opposite to the pulses generated by the transmitter.

BRIEF DESCRIPTION OF THE DRAWING

Other features of this invention will appear more clearly from the following description of an embodiment, the description being made in conjunction with the accompanying drawings wherein.

DESCRIPTION OF THE PREFERRED EMBODIMENT

Figure 1:
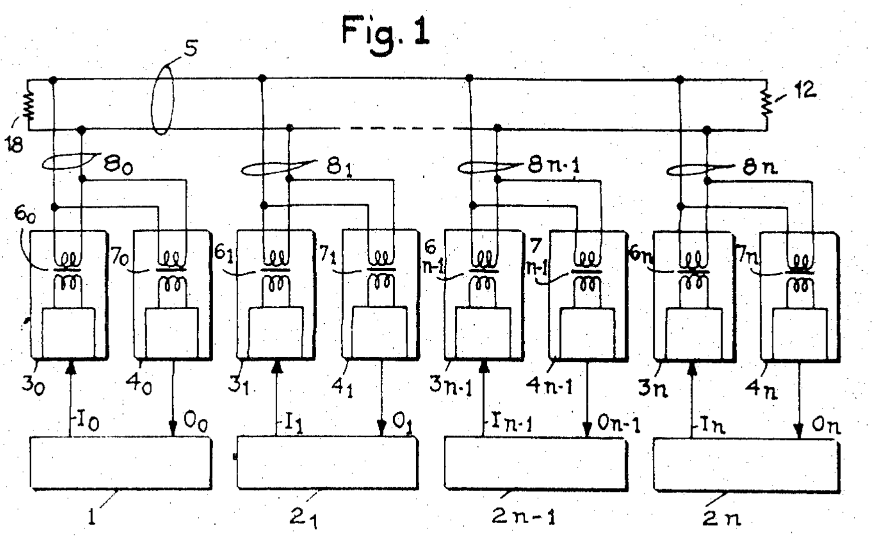
FIG. 1 is a principle diagram of a two-wire transmission line utilized in a time-shared mode by several equipments.

FIG. 1 shows by way of example a two-wire line utilized in a transmission link between a computer 1 and $n$ peripherals $\mathbf{2}_1$ — $\mathbf{2}_n$.

Each item 1 or 2 includes a pulse transmitter 3 controlled by a connection I, such as $I_0$ from computer 1, and a pulse receiver 4 delivering received data to the item via a reception connection O, such as $O_1$ to the peripheral $\mathbf{2}_1$.

Both pulse transmitters and receivers comprise coupling transformer to the two wire transmission line 5, such as the transformer $6_{n-}$ for transmitter $3_{n-}$ and transformer $\mathbf{7}_n$ for receiver $\mathbf{4}_n$.

In the described embodiment, the items, which are not located at the end of the line 5, are connected to the line 5 via a branch 8, such as $\mathbf{8}_1$ for peripheral $\mathbf{2}_1$. Such a branch supplies the primary winding of the corresponding transformer 7 and is supplied from the secondary winding of the transformer 6.

The line is conventionally loaded at its ends by its characteristic impedance such as resistors 12 and 18.

In a conventional manner, data exchange can be performed between only two items at a time, and in only one direction at a time. The computer is usually responsible for the line control handling according to processes which will not be further described because they are not involved in the invention.

Each item may comprise a plurality of pulse transmitters and receivers connected, as pairs, to different lines of the same data transmission link, so as to be able to simultaneously transmit or receive a certain number of pulsed data, each transmitter or receiver processing only one pulse at a time. Due to the great number of transmitters and receivers needed for such a link, it is therefore particularly of interest for cost and reliability results, to design a simple circuit such as that shown in FIG. 2.

Figure 2:
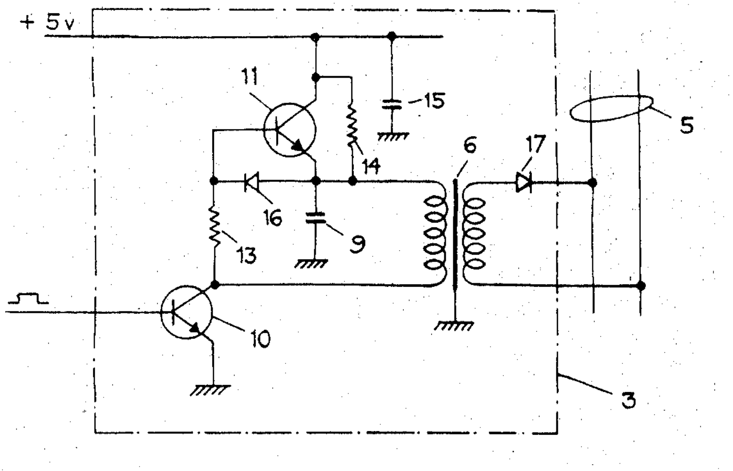
FIG. 2 is a diagram of a pulse transmitter according to this invention.

The pulse transmitter 3, as shown in FIG. 2, basically includes a coupling transformer 6 having a secondary winding connected between the two wires of the transmission line 5, a storage capacitor 9, a switch circuit 10 comprising a transistor NPN and means for recharging the capacitor 9, such means comprising a transistor NPN 11 operating as an amplifier.

The base of the switch transistor 10 is controlled by logic signals from the corresponding outside item - either computer or peripheral in the described example - so that the transistor 10 is unoperative, at rest. Transistor 10 operates as a pure switch. When it is operative, it connects the primary winding of transformer 6 to ground, directly, which enables the storage capacitor 9 to discharge through the primary winding. That discharge causes a pulse to appear at the secondary winding of transformer 6 and such a pulse is transmitted to line 5 via diode 17.

At the end of the pulse, the secondary winding generates a voltage, called reciprocal peak due to its shape, the reciprocal peak resulting from the fact that magnetizing transformer current does not vary instantaneously when the switch 10 is reset at the end of the pulse. The magnetizing current is progressively reduced and it is necessary that it is substantially null before occurence of the next pulse for avoiding a saturation of the magnetic circuit after having transmitted a number of pulses.

For accelerating the magnetizing current reduction, it is known that the transformer damping must be reduced, at least during the descreasing pulse phase. However, transformer damping depends on the secondary winding load, such a load being usually imposed since it is constituted by the transmission line.

As a result, it appears of interest to insulate the load from the transformer 6 during the decreasing pulse phase, which is conventionally performed by means of a diode 17 connected from a wire of line 5 and one terminal of the secondary winding of transformer 6. The damping is then constituted by the resistor 13 which may be adjusted for producing the best damping conditions. In addition to the transformer damping factor improvement during the decreasing pulse phase, the diode 17 makes it possible to suppress the reciprocal peak transmission on line 5 and the insulation of transmitter 3 from the line when it is unoperative which prevents it from constituting a load for another transmitter in case of time-shared line operation.

Roughly, the magnetizing current in the transformer has an amplitude proportional to the pulse duration that generates it, when the pulse duration is short with respect to the transformer time constant concerning the flat pulse top. Since the charge lost in the storage capacitor 9 is also a function of the pulse duration generated by the capacitor, it may be recharged in a substantially constant time by a charge current having an amplitude proportional to the reciprocal current peak amplitude and therefore to the charge lost by the capacitor for generating the preceding pulse. The reciprocal current peak is in the described embodiment. applied to the base of the amplifier transistor 11.

The pulse transmitter operation is thus as follows. When the transmitter is switched on, the storage capacitor 9 is charged through the charge resistor 14.

When a logic signal "one" is applied to the base of the switch transistor 10, the switch transistor 10 is conductive and causes the discharge of the capacitor 9 via the primary winding of transformer 6, therefore generating a pulse on line 5. The end of the pulse is produced by applying a logic signal "zero" to the base of the switch transistor 10 and the capacitor 9 no longer discharges through transistor 10. The magnetizing current is not cancelled instantaneously and a pulse current renders the transistor 11 operative, the transistor 11 being previously maintained unoperative by low potential of its base connected to ground, via resistor 13 and conductive transistor 10, and by the large positive voltage applied to its emitter.

The current pulse applied to the base of transistor 11 has an amplitude proportional to the charge lost by capacitor 9 resulting in charge current also proportional to that lost charge. Thus, capacitor 9 is recharged in a constant time.

During the transmission of a sequence of pulses, the pulse transmitter has to reach its rest condition between two pulses. As a result the circuit components will be so selected that the restoring time is shorter than the time interval between two successive pulses. In such conditions, the pulse amplitude is constant on the line whatever the cyclic pulse rate is, and the reference level remains constant.

The diode 16 is provided for protecting base-emitter junction of transistor 11 against reverse voltages occuring at the beginning of pulses.

Capacitor 15 is utilized for locally decoupling the pulse transmitter.

While the principles of the present invention have been hereabove described in relation with a specific embodiment, it will be clearly understood that the description has only been made by way of example and does not limit the scope of the invention.

What is claimed is:

1. A pulse transmitter for use with a two-wire transmission line comprising:

a transformer having a primary winding and a secondary winding coupled across said two-wire transmission line;

a storage capacitor having one terminal coupled to one terminal of said primary winding and the other terminal connected to ground, discharge of said storage capacitor through said primary winding producing a pulse for application to said two-wire transmission line;

a first normally non-conductive transistor having its base coupled to a control input, its emitter connected to ground and its collector coupled to the other terminal of said primary winding, a control signal of given polarity applied to said control input rendering said first transistor conductive to discharge said storage capacitor; and a second normally non-conductive transistor having its base coupled to said one terminal of said primary winding, its emitter coupled to said one terminal of said storage capacitor and its collector coupled to a power supply having a predetermined polarity, said second transistor being rendered conductive by a reciprocal current peak amplitude produced in said transformer after said storage capacitor produces said pulse to recharge said storage capacitor by a charging current having an amplitude proportional to said reciprocal current peak amplitude.

2. A pulse transmitter according to claim 1, wherein each of said first and second transistors are NPN transistors, and each of said given and said predetermined polarity is a positive polarity.

3. A pulse transmitter according to claim 1, further including a diode coupled between one terminal of said secondary winding and one wire of said transmission line to isolate said transmitter from said transmission line.

4. A pulse transmitter according to claim 1, further including a first diode coupled between said emitter and said base of said second transistor to protect said second transistor against reverse voltage occuring at the beginning of producing said pulse;

a first resistor coupled between the base of said second transistor and the collector of said first transistor to provide damping for said transformer;

a second resistor coupled between said collector of said second transistor and said one terminal of said storage capacitor to provide an initial charge for said storage capacitor; and a decoupling capacitor coupled between said collector of said second transistor and ground.

5. A pulse transmitter according to claim 4, further including a second diode coupled between one terminal of said secondary winding and one wire of said transmission line to isolate said trnsmitter from said transmission line.

6. A pulse transmitter according to claim 5, wherein each of said first and second transistors are NPN transistors, and each of said given and predetermined polarity is a positive polarity.

* * * * *